US005854729A

United States Patent [19]

Degeneff et al.

[11] Patent Number: 5,854,729

[45] Date of Patent: Dec. 29, 1998

[54] POWER SYSTEM DEVICE AND METHOD FOR ACTIVELY INTERRUPTING FAULT CURRENT BEFORE REACHING PEAK MAGNITUDE

[75] Inventors: Robert C. Degeneff, Niskayuna; Moises R. Gutierrez; Mietek T. Glinkowski, both of Troy, all of N.Y.

[73] Assignee: Utility Systems Technologies, Inc., Niskayuna, N.Y.

[21] Appl. No.: 862,983

[22] Filed: May 23, 1997

[51] Int. Cl.[6] ........ H02H 3/00

[52] U.S. Cl. ........ 361/4; 361/13

[58] Field of Search ........ 361/4, 2–3, 5–7, 361/8–9, 13, 17, 54, 57, 93, 102, 115; 335/18, 19, 15, 26, 27

[56] References Cited

U.S. PATENT DOCUMENTS

| | | | |
|---|---|---|---|
| 3,390,305 | 6/1968 | Greenwood | 361/4 |
| 3,435,288 | 3/1969 | Greenwood | 361/4 |
| 3,476,978 | 11/1969 | Greenwood | 361/4 |
| 3,489,951 | 1/1970 | Greenwood et al. | 361/4 |
| 3,796,891 | 3/1974 | Kind et al. | 307/135 |
| 3,935,509 | 1/1976 | Eidinger | 361/3 |
| 4,056,836 | 11/1977 | Knauer | 361/4 |
| 4,172,268 | 10/1979 | Yanabu et al. | 361/4 |
| 4,305,107 | 12/1981 | Murano et al. | 361/4 |
| 4,307,428 | 12/1981 | Yanabu et al. | 361/4 |
| 4,740,858 | 4/1988 | Yamaguchi et al. | 361/4 |
| 5,402,297 | 3/1995 | Ouchi et al. | 361/4 |
| 5,452,170 | 9/1995 | Ohde et al. | 361/13 |

OTHER PUBLICATIONS

Basil C. Papadias, "Approaches to Short–Circuit Current–Limiting", A Thesis Submitted to the Graduate Faculty of Rensselaer Polytechnic Institute in Partial Fulfillment of the Requirements for the Degree of Doctor of Engineering, Rensselaer Polytechnic Institute, Troy , New York, pp. 30–55 and 154–161 (Feb. 1975).

*Primary Examiner*—Jeffrey A. Gaffin
*Assistant Examiner*—Michael J. Sherry
*Attorney, Agent, or Firm*—Heslin & Rothenberg, P.C.

[57] ABSTRACT

A device/method for actively interrupting fault current in an ac or dc power system before the fault current is capable of growing to peak magnitude or steady state condition, respectively, is presented. In an ac implementation, a commutating capacitance of desired polarity from one of two commutating circuits is coupled across a circuit interrupter comprising a pair of separable contacts. The circuit interrupter operates to open circuit the power system upon reaching zero current therethrough. The commutating capacitance of appropriate polarity actively drives the fault current to zero before the fault current reach peak magnitude, thereby allowing the circuit interrupter to open circuit the power system before the fault current's natural current zero. In dc implementation, the commutating capacitance is connected to dissipate a fault current while the system is in transient state, thereby protecting the power system from full steady state fault current condition. In both ac and dc implementations, the circuit interrupter is resettable upon clearing of a fault condition. The circuit interrupter can comprise a vacuum interrupter, a silicon-controlled rectifier or a thyristor. The approach is applicable to single phase or three-phase power systems.

24 Claims, 8 Drawing Sheets

POWER SYSTEM DEVICE AND METHOD FOR ACTIVELY INTERRUPTING FAULT CURRENT BEFORE REACHING PEAK MAGNITUDE

TECHNICAL FIELD

The present invention relates in general to interrupting fault current in a power system, and more particularly, to a device and method for actively interrupting fault current in an ac power system before the fault current is capable of growing to a peak magnitude or in a dc power system before the fault current is capable of reaching steady state condition.

BACKGROUND ART

Without a current limiting device, fault current in a power system is limited only by system voltage and the equivalent impedance of the connections, i.e., transmission lines, transformers, etc. This impedance is often so small that the fault current can greatly exceed normal full load current. Therefore, during a fault condition the system equipment, i.e., lines, transformers, switches, buses, etc., can be subjected to very high electrical and electromagnetic stresses, which can obviously be destructive. Further, it is often the case that older circuit breakers installed on existing power systems are unable to interrupt a system fault current because the power system has grown over time through the installation of new lines, cables, power plants, etc.

Current limiting devices presently in use in the electric power industry are also limited in their range of applications. For example, current limiting fuses are normally not recommended above 200 amperes (RMS) because of the substantial physical length and low speed of response, i.e., the longer melting time required. Reactors are another type of current limiting device. Unfortunately, current limiting reactors are expensive and have high operating costs due to inherent losses. Besides fuses and reactors, there are in the electrical power market other types of current limiting devices which are applicable for medium voltage range and ac rated currents below 3 kA (RMS). These current limiting devices are typically single-shot units, i.e., fuse based, which need to be manually replaced after fault clearing.

Today, power systems are more interconnected than ever before. Existing generating plants, transmission lines, cables, circuit breakers, etc., continue to be pushed to their limits. Obviously, certain equipment has to periodically be replaced or up-graded. Further, there is recognized within the industry a growing need to increase the rating of existing switch gear because short circuit current levels within the power systems continue to steadily increase.

The present invention addresses the above-outlined needs by providing a device and method which operate on a time critical, active approach to the current limiting function.

DISCLOSURE OF INVENTION

Briefly summarized, the present invention comprises in one aspect a device for controlling fault current in an ac power system. The device includes a circuit interrupter comprising a pair of separable contacts for connection in series with the power system. The circuit interrupter is operable to open circuit the ac power system at zero current therethrough. A first commutation circuit and a second commutation circuit are selectively connectable in parallel with the circuit interrupter. The first commutation circuit has a first commutating capacitance with a positive polarity when charged and the second commutation circuit has a second commutating capacitance with a negative polarity when charged. A control circuit is provided for opening the circuit interrupter upon detection of fault current and for selecting and connecting either the first commutation circuit or the second commutating circuit in parallel with the circuit interrupter to thereby discharge into the circuit interrupter the first commutating capacitance or the second commutating capacitance. The control circuit selects the commutation circuit with commutating capacitance of opposite polarity to the polarity of the fault current detected within the power system. The device operates to actively drive fault current in the circuit interrupter to zero before a peak magnitude of the fault current can be reached.

In another aspect, an active device for controlling fault current in an ac power system is provided. This active device comprises a circuit interrupter having a pair of separable contacts for connection in series with the power system. The circuit interrupter is operable to open circuit the power system upon reaching zero current therethrough. Circuit means are provided for actively driving current in the circuit interrupter to a zero current crossing upon detection of fault current before the fault current can reach a peak magnitude.

A device for controlling fault current in a dc power system is also provided. The device includes a circuit interrupter comprising a pair of separable contacts for connection in series with the dc system. The circuit interrupter is operable to open circuit the dc power system upon reaching zero current therethrough. A single commutation circuit, having a commutating capacitance, is connectable in parallel with the circuit interrupter. A control circuit is provided for opening the circuit interrupter upon detection of a transient fault current in the circuit interrupter and for coupling the commutation circuit across the circuit interrupter for commutation of the transient fault current within the circuit interrupter by driving current within the circuit interrupter to zero, thereby allowing the circuit interrupter to open circuit the dc power system. The control circuit comprises means for commutating the fault current within the circuit interrupter within a time interval less than approximately one-half a natural time constant of the dc power system, wherein the transient fault current is interrupted before reaching steady state magnitude.

In still another aspect, a fast acting mechanism is provided for mechanically opening a circuit interrupter having a pair of separable contacts connectable in series with a power system. The pair of separable contacts include a stationary contact and a moveable contact. The fast acting mechanism comprises a housing having an inner chamber and a piston sized to reciprocate within the inner chamber of the housing. The piston has an annular groove in an outer circumference thereof sized to receive a split ring. The split ring includes a split which is disposed such that a first end of a key can reside therein to expand the split ring. The key includes a second end sized to reside within or pass through an opening in the housing, with the key being reciprocal transverse to the reciprocal direction of the piston within the inner chamber of the housing. Means for coupling the piston to the moveable contact of the circuit interrupter is provided, along with a biasing mechanism coupled to the piston for biasing the moveable contact in an open position relative to the stationary contact of the circuit interrupter. Operationally, when the key is removed from engagement with the split ring, the split ring retracts and the biasing means forces the piston to reciprocate into the inner chamber of the housing, thereby drawing the moveable contact away from the stationary contact.

In a further aspect, the invention comprises a device for controlling fault current in a power system employing multiple circuit interrupters coupled in parallel in an interruption circuit, each circuit interrupter comprising a pair of separable contacts. The interruption circuit is connected in series with the power system. At least one circuit interrupter of the interruption circuit has a first current rating, and at least one circuit interrupter of the interruption circuit has a second current rating, wherein the second current rating is less than the first current rating. The device further comprises a control circuit for opening the at least one circuit interrupter of the second current rating prior to opening of the at least one circuit interrupter of the first current rating so that the fault current passes through the at least one circuit interrupter of the first current rating. Thus, only one circuit interrupter of higher current rating need be employed to handle a fault current, while still minimizing impedance through the interruption circuit during normal load operation. Preferably, the at least one circuit interrupter having the first current rating is employed in combination with a commutation circuit and control circuit as described herein.

Methods corresponding to the techniques implemented by the above-outlined devices are also described and claimed.

To summarize, provided herein are various devices and methods for actively interrupting fault current within an ac or dc power system before the fault current can grow to a peak magnitude or reach steady state condition, respectively. Generally stated, the strategy is to use a circuit interrupter, such as a vacuum interrupter, to open the circuit and then at a precisely controlled time to discharge a pre-charged capacitor coupled in parallel with the circuit interrupter to limit the level of fault current through the interrupter, and thus, through the power system. For an ac power system, two commutating circuits are connectable in parallel with the circuit interrupter, the commutating circuits having equal commutating capacitances, but opposite charge polarity. Active interrupting of fault current in accordance with the present invention applies to an ac power system of any voltage and frequency. Further, the circuit interrupter can comprise any circuit breaker which has the capability of interrupting high frequency currents, however, a vacuum interrupter is preferred.

The current limiting device and method presented can be applied to new electrical installations or to upgrading of existing circuit interrupting equipment. Additionally, the invention applies to both single-phase systems, as well as to three-phase systems. In all embodiments, a fast acting mechanism is employed to initiate opening of the circuit interrupter contacts in a sufficiently short amount of time to establish a physical gap between the contacts of the interrupter and draw an arc within the interrupter. Commutation of current through the interrupter then occurs before the fault current has an opportunity to reach peak value. Ideally, the circuit interrupter and fast acting mechanism are designed to respond to maintain the fault current at less than one-half its normal peak value.

BRIEF DESCRIPTION OF DRAWINGS

The subject matter which is regarded as the present invention is particularly pointed out and distinctly claimed in the concluding portion of the specification. The invention, however, both as to organization and methods of practice, together with further objects and advantages thereof, may best be understood by reference to the following detailed description taken in conjunction with the accompanying drawings in which:

BEST MODE FOR CARRYING OUT THE INVENTION

Generally stated, the present invention comprises in one aspect a new approach to interrupting fault current in an ac power system before the fault current is able to reach peak magnitude. Conceptually, this aspect is accomplished by providing a means for actively driving fault current to zero upon being detected. A circuit interrupter, such as a vacuum interrupter (VI), silicon-controlled rectifier (SCR) or triggered vacuum gap, has its through current driven to zero through the discharging of a commutating capacitor coupled in parallel therewith. Discharging of the capacitor can be selectively controlled via a triggered vacuum gap or SCR before the main power frequency reaches maximum value.

Figure 1:
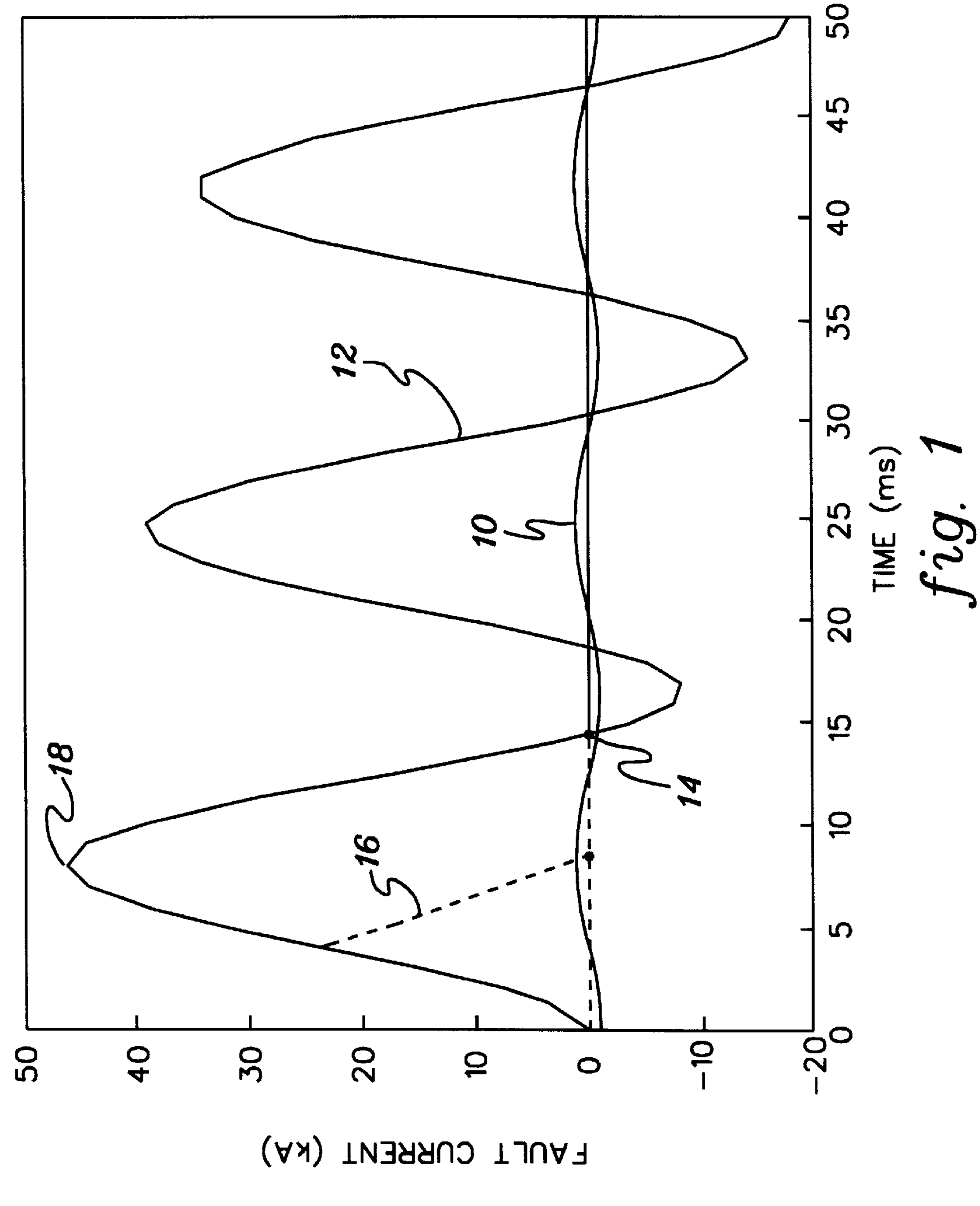
FIG. 1 is a graph of normal operating load current in a power system, as well as an example of a fault current and the effect thereon of a conventional current limiting device compared with a current limiting device in accordance with the present invention.

FIG. 1 depicts one embodiment of a load current signal 10 within an ac power system, along with a fault current signal 12 within such a system assuming no current limiting device is employed. A circuit interrupter such as used herein would operate conventionally to interrupt fault current at a natural zero crossing of the signal 14. Upon interruption, a constant zero current signal 14 is achieved within the power system. As shown, however, the power system still experiences at least one full half cycle of the fault current including a maximum magnitude 18. The present invention seeks to actively drive the fault current through the current interrupter to zero well before the first natural current zero, thereby preventing the fault current from reaching peak magnitude. FIG. 1 depicts one example wherein fault current 16 commutated in accordance with the present invention is shown driven to zero such that the fault current grows to only roughly one-half or less the magnitude it would otherwise reach. Various embodiments for accomplishing this timely driving of the fault current to zero are described herein.

Figure 2:
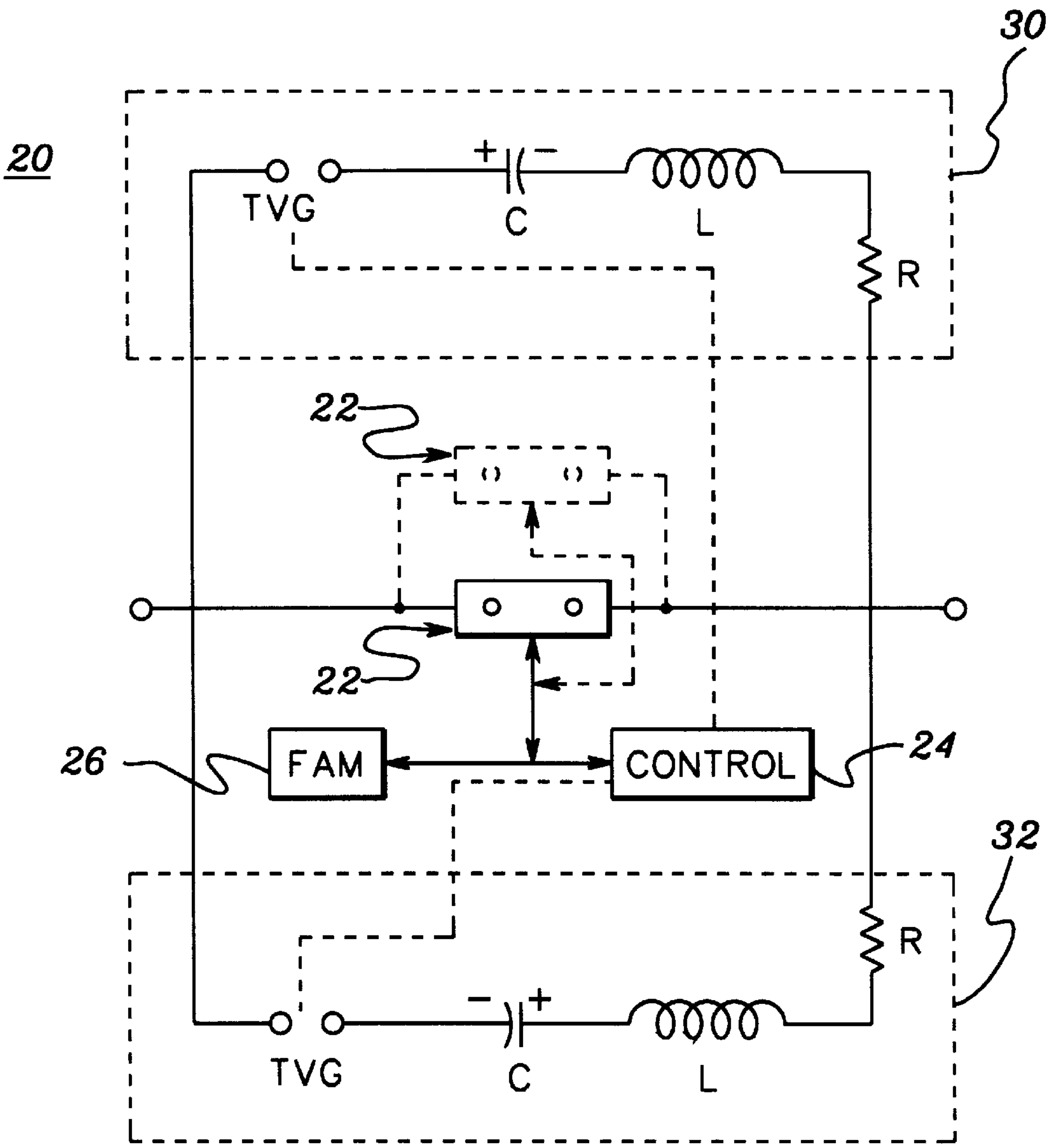
FIG. 2 is a schematic of one embodiment of a current limiting device in accordance with the present invention.

FIG. 2 depicts one embodiment of a current limiting device 20 in accordance with the present invention. Device 20 includes one or more circuit interrupters 22 disposed in parallel, such as a vacuum interrupter, along with control circuitry 24 and a fast acting mechanism 26 for quickly opening (discussed below) the circuit interrupter upon detection of fault current within the ac power system. To assure proper operation of fault current limiting device 20, two commutating circuits 30 & 32 are utilized in parallel. Circuits 30 & 32 each include a triggered vacuum gap (TVG) and a commutating capacitor (C). The commutating capacitors are precharged with equal, but opposite voltages as shown. Each commutating circuit 30 & 32 inherently includes an inductance (L) and a resistance (R).

Operationally, when a fault occurs it is first detected by a protective relaying scheme (not shown) comprising one or more current sensors. When the rate of change of current is greater than a certain preset value, and the magnitude of the current is greater than a certain value, a trip signal is sent to current limiting device control 24 to initiate current interruption. Since the current limiting device in accordance with the present invention has to be operated very quickly, i.e., within a quarter of the 60 Hz cycle (4.166 ms), the signal to operate the device has to be quickly provided for the control module 24.

An algorithm for quick detection of a fault current can be based on two fundamental criteria; namely, the magnitude of the instantaneous current measured through the current limiting device is greater than a permissible threshold value set in the control, and the rate of rise of current through the current limiting device is greater than a maximum rate of rise value set in the control. Both of these conditions have to be satisfied in order for the control to issue a trip signal to the current limiting device, i.e., the condition for tripping of the current limiting device is a logic AND of the two variables. This way the device can be prevented from activating in response to noise or higher frequency disturbances superimposed on normal load current. Typically, the time required for the sensing module to detect a fault condition and issue a trip signal is of the order of 100 $\mu$s or less. One of ordinary skill in the art can readily implement such a protective relaying scheme employing existing current and/or voltage sensors.

The trip signal operates fast acting mechanism 26 to open vacuum interrupter 22 by separating its contacts. A vacuum interrupter is just one example of a circuit interrupter which can be used in accordance with the present invention. Again, a circuit interrupter as employed herein comprises a pair of separable contacts which connect in series with the power system (not shown). The arc within the vacuum is drawn inside the interrupter. A short time later, approximately 0.5–1.5 milliseconds, one of the triggered vacuum gaps (TVG) of the commutation circuits is fired. The selection of which TVG to fire depends on the polarity of the 60 Hertz half cycle at which the fault occurred, which can be derived from the same protective relaying scheme using electronic circuitry, e.g., within control 24.

The selected triggered vacuum gap then starts discharging the corresponding commutating capacitor (C) through the inductor and the vacuum arc already existing in the vacuum interrupter 22. The direction of the discharge is such that the current from the capacitor is opposite that of the fault current so that the commutating current subtracts from the main fault current and thus reduces the magnitude of the total current. This actively drives the fault current through the circuit interrupter 22 to a current zero. At current zero, the main vacuum interrupter 22 extinguishes the arc and clears the fault, thereby open circuiting the power system. As shown in FIG. 1, this is accomplished before the sensed fault current reaches maximum peak value, and preferably, limits the fault current to one-half or less its peak value.

Figure 3:
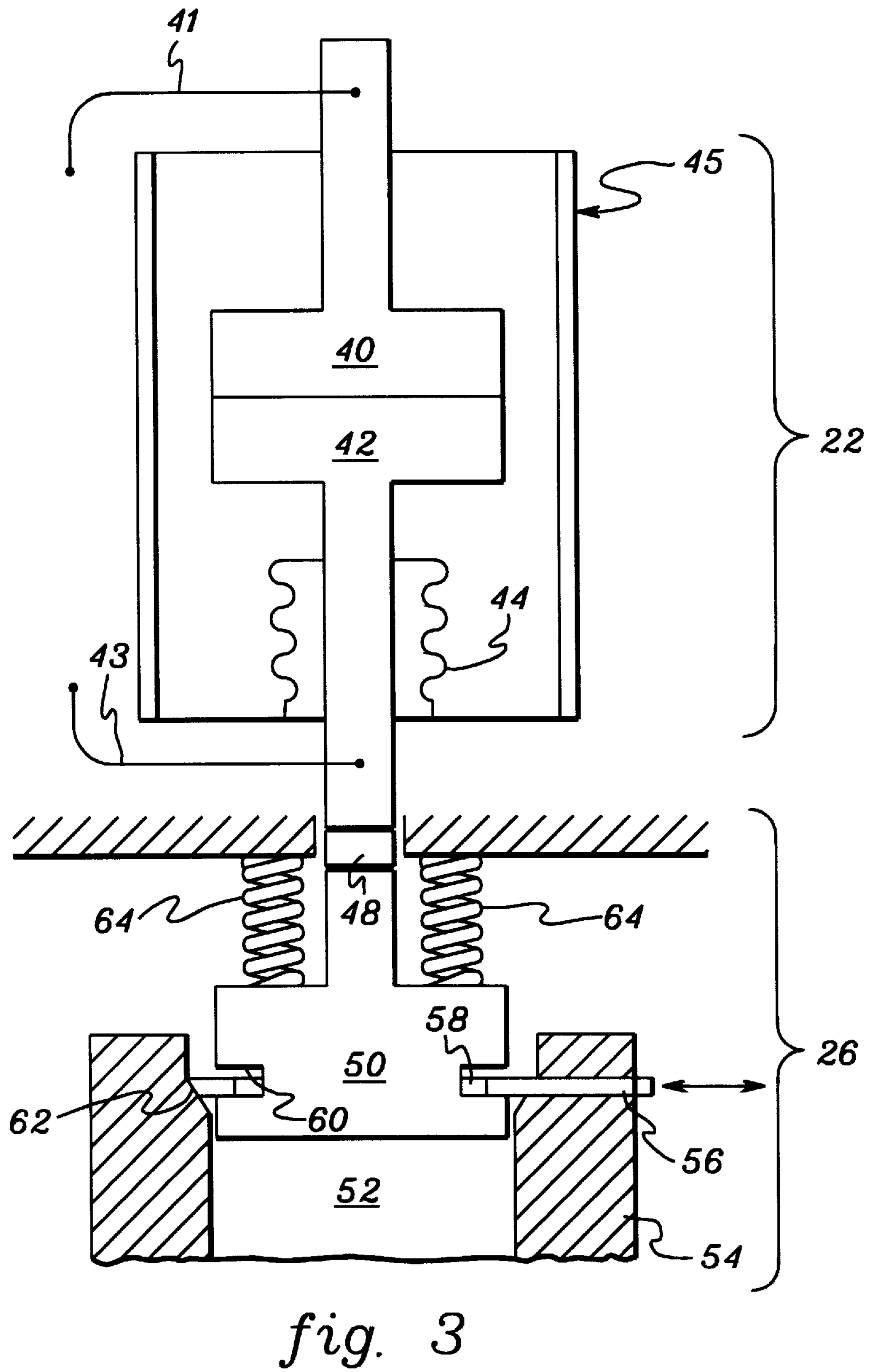
FIG. 3 depicts one embodiment of a circuit interrupter coupled to a fast acting mechanism in accordance with the present invention.

FIG. 3 depicts one embodiment of fast acting mechanism (FAM) 26 coupled to circuit interrupter 22 in accordance with the present invention. Interrupter 22 has a first contact 40 and a second contact 42 which are separable. The contacts are shown in closed position such that current would be conducted through circuit interrupter 22. Contact 40 is assumed to comprise a stationary contact, while contact 42 is moveable, e.g., through the use of a flexible bellow construction 44. Contacts 40 & 42 are electrically coupled (41 & 43), respectively, in series with the power system. The separable contacts are disposed within an outer envelope 45. Moveable contact 42 is coupled through an isolation block 48 to a piston member 50 of FAM (26). Member 50 is capable of reciprocating within an inner opening 52 defined in a fixed cylinder 54. Piston member 50 is held in position in this embodiment via engagement of a transversely reciprocal key 56 in contact with a split in a split-ring 58 within an outer circumferential channel 60 defined within member 50. When key 56 is so engaged with split-ring 58, split-ring 58 is expanded and partially resides against a conical-shaped wall portion 62 of cylindrical housing 54. Member 50 is constantly charged by a linear or coil spring(s) 64.

As noted, the structure depicted in FIG. 3 comprises one embodiment of a fast type mechanism for opening the contacts of the circuit interrupter. Such a mechanism is able to operate within a time less than a quarter of the 60 hertz cycle of current within the power system. The main energy store for mechanism 26 comprises spring 64, or a set of springs depending upon the required amount of energy and force. Torsional springs have faster time response and less inherent inertia, and therefore may be better suited for the fast acting mechanism 26. The tripping of the device, i.e., releasing of the energy of the springs to initiate opening of the contacts of the circuit interrupter, is accomplished by the split-ring release design. In normally closed state as shown, key 56 is inserted in split-ring 58 preventing the ring from collapsing under the opening force produced by springs 64. When the key is removed, the split-ring 58 collapses allowing member 50 to be driven downward and pulling moveable contact 42 away from stationary contact 40 of the current interrupter. The design is very energy efficient since the embodiment presented has a very high ratio of energy released form the springs to energy required to remove key 56 from split-ring 58.

Once the current limiting device has opened the circuit, the resetting process can be accomplished automatically or by human intervention via the logic control unit. This control unit will send a signal to recharge the commutating capacitor and a signal to the operating mechanism for circuit breaker closing. When the closing signal is received by the electrovalve, it will open allowing compressed air (for example) to be injected into the operating mechanism. This fluid flow will force the movable contact of the circuit breaker to move in the closing direction until the movable contact reaches the stationary contact of the circuit breaker. At the end of the process, by an electric or pneumatic device, key 56 will be inserted in split-ring 58 locking the closed position of the circuit breaker. At the same time, as a consequence of the contact movement, the torsional bar is twisted and recharged. When the recharging signal is received from the control unit by a controlled switch, the commutating capacitor will be connected and recharged from a recharging circuit composed of a dc power supply, a resistor, and an SCR or any other automatically controlled switch.

Figure 4A:
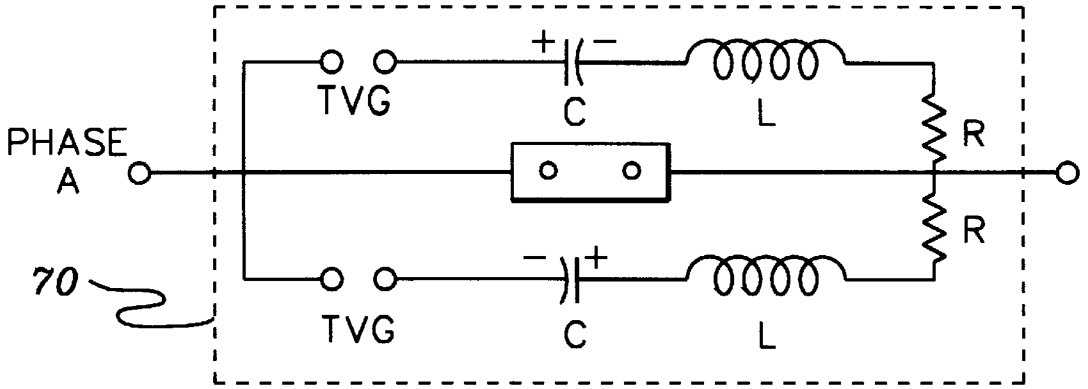
FIGS. 4*a*, 4*b*, 4*c* depict one embodiment of a current limiting device for a three-phase power system in accordance with the present invention.
Figure 4B:
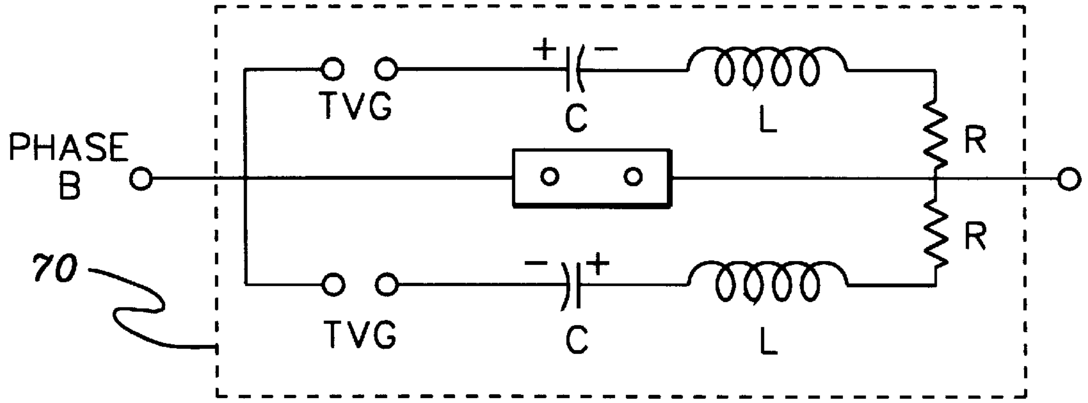
Figure 4C:
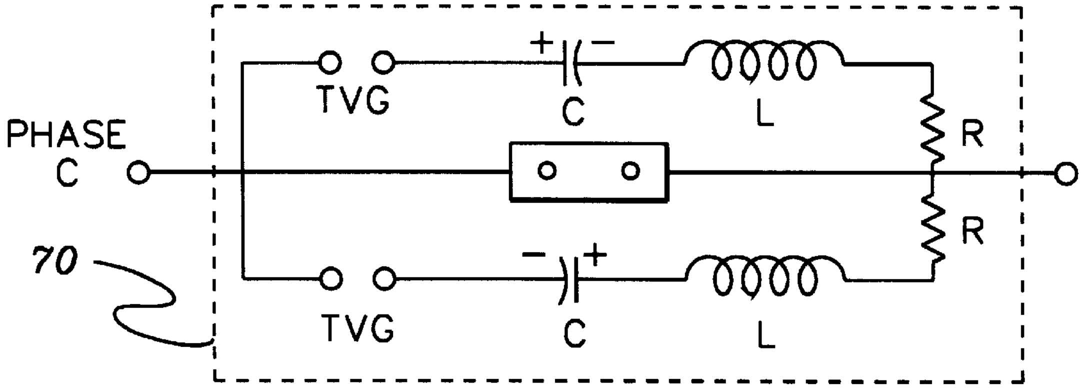

The description provided above assumes that the current limiting device is employed in a single-phase power system. The concepts presented herein, however, are equally applicable to three-phase systems. FIGS. 4a, 4b and 4c depict one embodiment of a current limiting device 70 connected in series with each phase, i.e., Phase A, B & C, of a three-phase power system. Each current limiting device 70 is substantially identical to device 20 discussed above in connection with FIG. 2. Alternatively, a set of three three-phase circuit interrupters could be employed in a three-phase system, operated by one fast acting mechanism and one control circuit for opening and closing the circuit interrupters, in which case two three-phrase commutation circuits would be needed. The commutation circuits would contain equal commutating capacitances, but opposite polarity.

Figure 5:
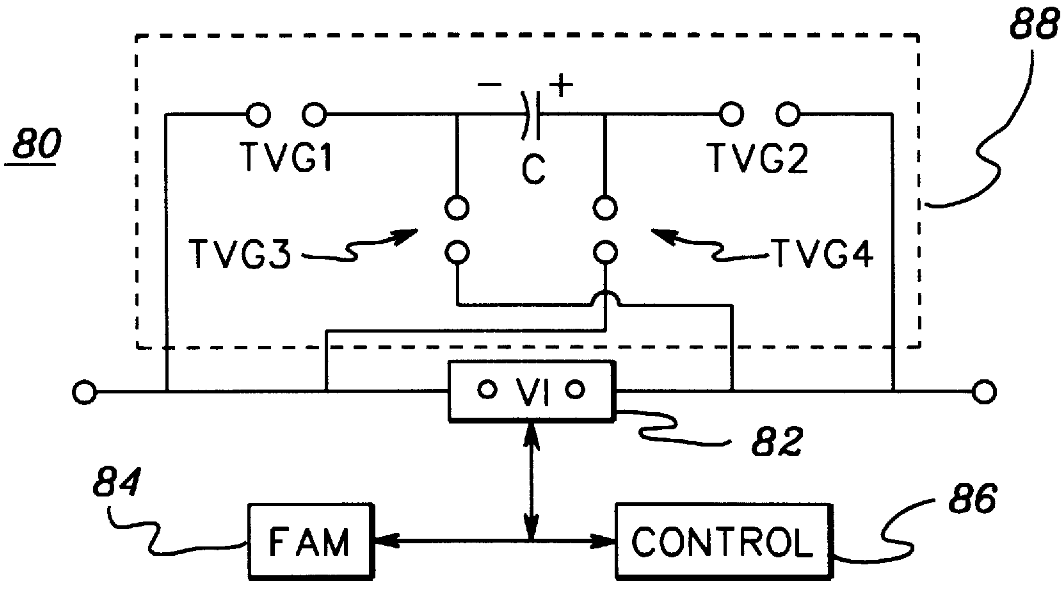
FIG. 5 is a schematic of an alternate embodiment of a current limiting device in accordance with this invention using only one commutating capacitor and four triggered vacuum gaps.
Figure 6:
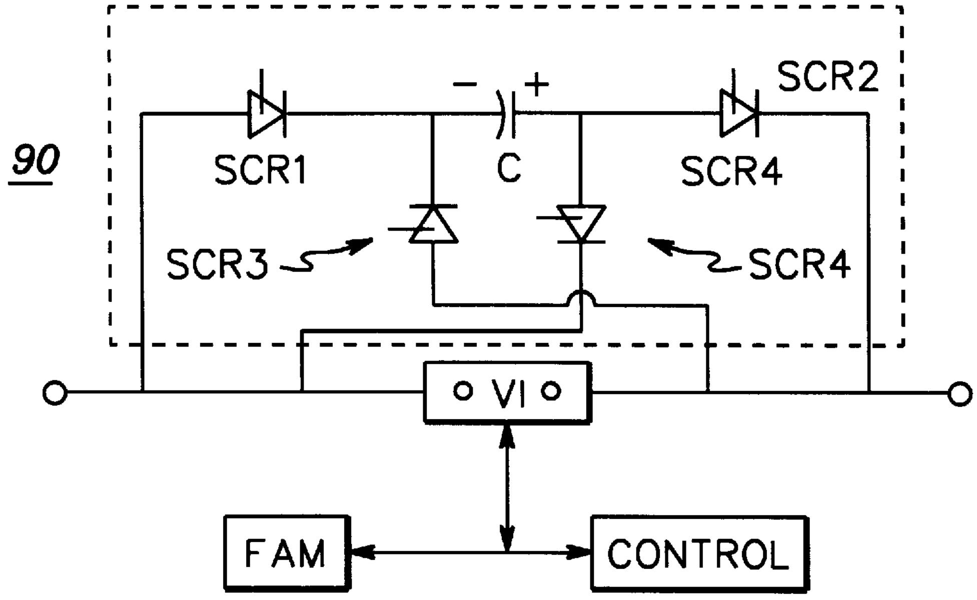
FIG. 6 is a schematic of still another embodiment of a current limiting device in accordance with the present invention using only one commutating capacitor and four solid-state switches instead of the triggered vacuum gaps of FIG. 5.

FIGS. 5 & 6 depict alternate embodiments of a current limiting device in accordance with the present invention. In FIG. 5, device 80 includes a current interrupter, such as vacuum interrupter 82, which is controlled by a fast acting mechanism 84 and control circuitry 86 as described above. A commutating circuit 88 is provided for selectively coupling a commutating capacitance (C) in parallel with the circuit interrupter. The appropriate polarity for the commutating capacitance is established by selectively closing two of four triggered vacuum gaps, labeled TVG1, TVG2, TVG3 & TVG4. Specifically, a first polarity of the commutating capacitance is applied by selectively closing only TVG1 & TVG2, while the opposite polarity is achieved by selectively closing only TVG 3 & TVG 4. This embodiment, as well as that of FIG. 6, has the advantage of only requiring one commutating capacitor. Thus, economics may be a consideration in deciding whether the embodiment of FIG. 2 or one of the embodiments of FIGS. 5 or 6 is employed.

The current limiting device 90 of FIG. 6 is substantially identical to device 80 of FIG. 5, except that the switching means for coupling the commutating capacitance across the vacuum interrupter (VI) is changed to silicon-controlled rectifiers from the triggered vacuum gaps of FIG. 5. A first polarity of commutating capacitance is achieved by closing only silicon-controlled rectifiers SCR1 & SCR2, while the opposite polarity is applied by selectively closing only SCR3 & SCR4.

Figure 7:
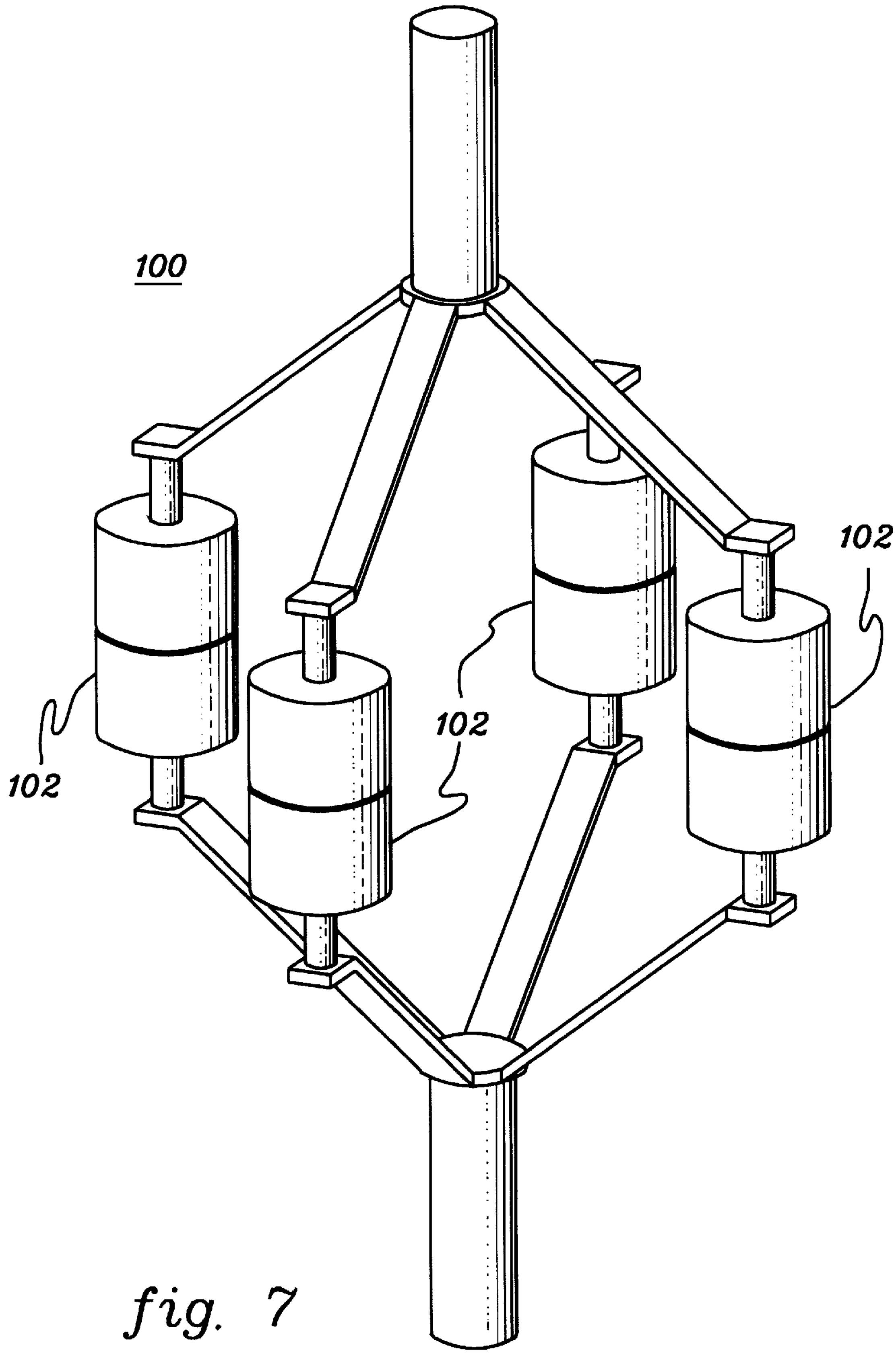
FIG. 7 depicts one embodiment of a circuit interruption device comprising multiple circuit interrupters coupled in parallel for handling a fault current in accordance with the present invention.

A further aspect of the present invention is described below with reference to the interruption circuit 100 depicted in FIG. 7. This circuit 100 comprises four parallel circuit interrupters 102, such as vacuum interrupters. More or less parallel connected circuit interrupters 102 could be employed, with the number being dictated by the total, closedposition, steady state loss of each interrupter. That is, since losses are I·I·r, the more interrupters in parallel, the lower the losses will be. "I" represents the current in the system, while "r" is the resistance of the contacts within a single circuit interrupter. Thus, losses within "n" parallel disposed interrupters such as depicted in FIG. 7 will be I·I·r/n Watts and a single interrupter loss will be reduced to I·I·r/n·n. A circuit interrupter, such as a vacuum interrupter, is typically so efficient that a single interrupter can be used to clear the fault current. Therefore, one of the four parallel interrupters of FIG. 7 is capable of handling the fault current by itself.

In accordance with the present invention, parallel interrupters could be employed during a fault or short circuit as described below. When a fault occurs, it is detected by a protective relaying scheme (not shown) comprising one or more current sensors. Detection of fault current is well known in the art and a fault current sensor for use in combination with a current limiting device in accordance with the present invention can be readily implemented by one of ordinary skill in the art. When the rate of change of the current is greater than a certain preset value and the magnitude of the current is greater than a preset value, then a trip signal is sent to the current limiting device in accordance with the present invention. The trip signal operates the fast acting mechanism (not shown) to open the interruption circuit 100. In accordance with the invention, the parallel disposed interrupters of FIG. 7 are opened in two groups. The first group, which comprises all of the interrupters except for one, is opened first. This diverts all of the fault current through the unopened interrupter. The unopened interrupter is specially designed, i.e., rated higher, to handle the fault current and is opened a short time later.

Also, the last interrupter open could comprise a current limiting device such as depicted in FIGS. 2, 5, or 6 hereof. The arc in the vacuum would be drawn inside this special interrupter and a short time later, e.g., approximately 0.5–1.5 milliseconds, the appropriate triggered vacuum gap(s) of the commutation circuits would fire. Thus, the fault current can be actively driven to zero as described above. Upon reaching current zero, the vacuum interrupter extinguishes the arc and clears the fault. Again, this occurs before the fault current has a chance to reach maximum peak value.

As an alternative embodiment, a current limiting device in accordance with the present invention could be associated with each of the vacuum interrupters coupled in parallel in the design of FIG. 7. The vacuum arc has a positive voltage-current characteristic which means that when the arc current increases, the arc voltage increases as well. Thus, the individual interrupters will naturally share the current among each other. If one of the interrupters carries more current than the others, its arc voltage will increase and this will suppress the current to a value at which all the arc voltages and currents are approximately the same. This is a natural feedback that is self-compensating.

Figure 8:
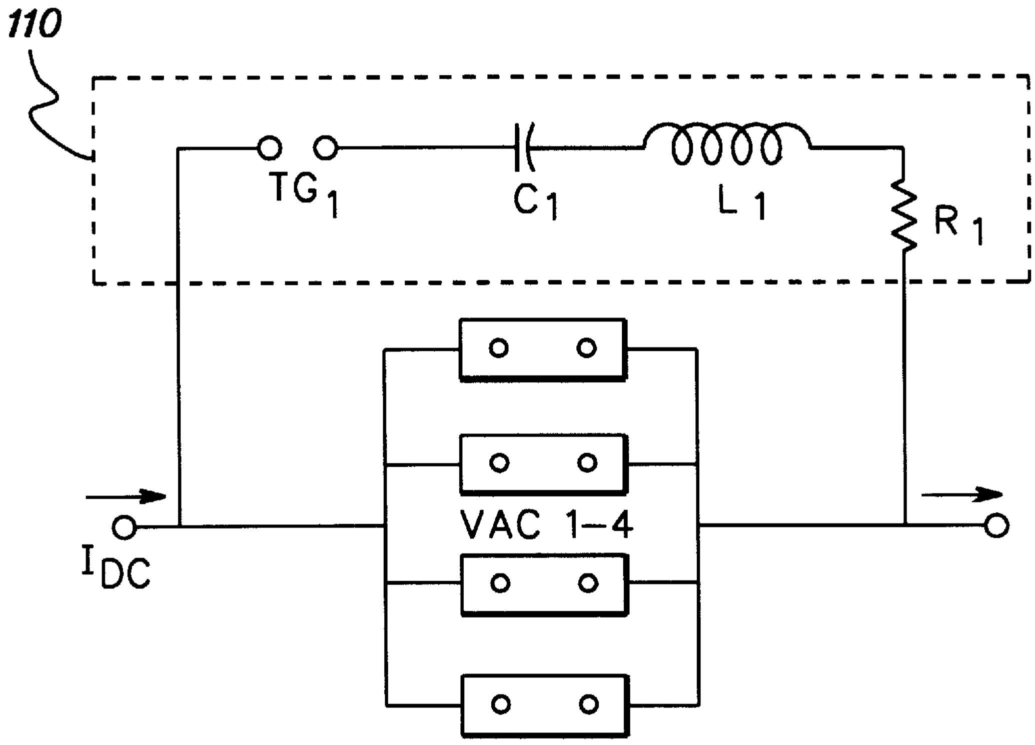
FIG. 8 is a schematic of one embodiment of a current limiting device in accordance with the present invention for a dc power system.

A current limiting device in accordance with the present invention can also be constructed for a dc power system. FIG. 8 depicts one embodiment of such a device. In this embodiment, four vacuum interrupters VAC 1–4 are employed in parallel, along with a commutating circuit 110, having a commutating capacitance $C_1$. FIG. 8 extends the single interrupter design and establishes a design containing parallel interrupters. This configuration will possess a more complex mechanical trip (or opening) scheme. In this design three of the four interrupters are designed to open initially, diverting all fault current into the remaining interrupter. The remaining high-rated interrupter then opens and interrupts the fault current. This strategy insures a lower operating temperature for the interrupter during steady state. Additionally, it will insure a more cost effective system to construct since the commutating circuit will only have to contend with the current through a single interrupter.

Figure 9:
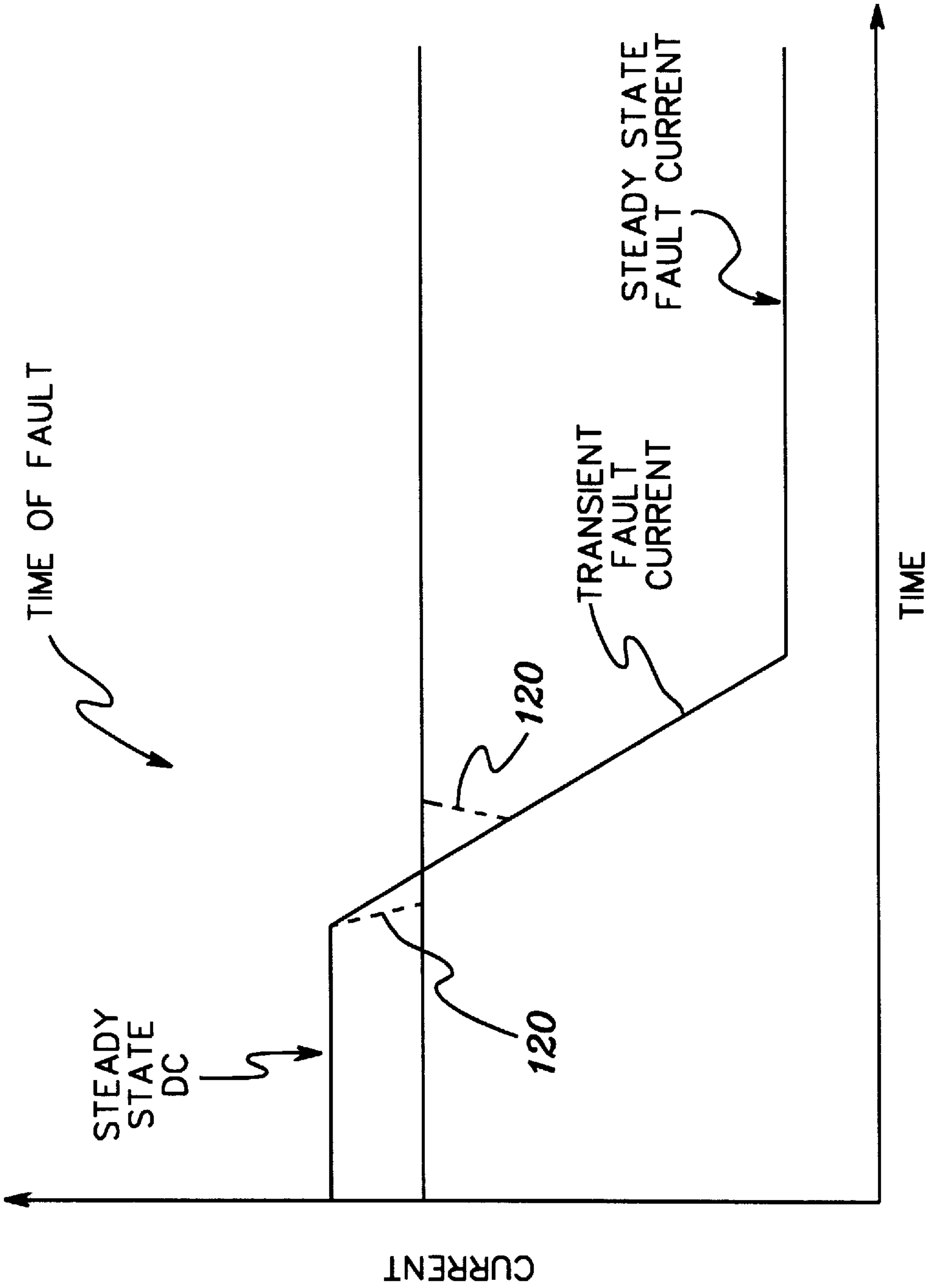
FIG. 9 is a graph of normal operating dc load current between a dc generator and motor, as well as an example of the fault current in the system if a fault occurred between the motor and generator and no current limiting device were in use compared with fault current if a fault current limiting device in accordance with the present invention is used.

FIG. 9 is a graph of normal operating dc load current between a dc generator and motor, as well as an example of an expected fault current on the system if a fault occurred between the motor and generator with no current limiting device in use. This portion of the figure is shown in a solid line. The first portion of the curve is the steady state value of dc current. The second portion of the curve is the transition period form the steady state value to the full fault current. This transition period is dictated by the circuit within which the breaker is located. The final portion of the dc current profile shown in FIG. 9 is the full dc fault current limited only by the resistance of the system. In typical systems the fault current will be 10 to 50 times the steady state current. Additionally, fault current is shown if a fault current limiting device in accordance with the present invention is used. This is shown by the dotted lines 120. Two examples are shown, where the difference is the polarity of the capacitor used to drive the fault current to zero.

As used in this application, the term "fast acting mechanism" comprises a mechanism able to initiate the opening of the interrupter contacts in a sufficiently short amount of time to establish a physical gap between the contacts of the interrupter before the fault current reaches an undesirably high value. For ac systems, a fast acting mechanism can be defined relative to the 60 Hertz frequency. Since the short circuit current has to be limited to less than the first peak of the 60 Hertz waveform with the appropriate offset depending upon the instant of the short circuit, the fast acting mechanism operating time should be less than the time it takes to reach this first peak, i.e., T/2=8.33 ms (where T is the period for the system frequency). Therefore, typically the operating time of a fast acting mechanism should be 10–70% of 8.333 ms. For dc systems, a fast acting mechanism is defined relative to the natural time constant of the dc power system. Since as a first approximation the dc power system can be represented as an equivalent circuit of resistance $R_{sys}$ and inductance $L_{sys}$ in series, the natural time constant $\tau$ of the dc system is $\tau=L_{sys}/R_{sys}$ (s) , wherein $L_{sys}$ is the effective series inductance of the faulted dc system and $R_{sys}$ is the total effective post fault system series resistance. Therefore, in dc systems the fast acting mechanism's operating time from the instant of receiving the open signal to the physical contact separation should be less than $\tau$. Preferably, the separation time is on the order of 10–50% of $\tau$ to qualify as "fast".

To summarize, provided herein are various devices and methods for actively interrupting fault current within an ac or dc power system before the fault current can grow to a peak magnitude or reach steady state condition, respectively. Generally stated, the strategy is to use a circuit interrupter, such as a vacuum interrupter, to open the circuit and then at a precisely controlled time to discharge a pre-charged capacitor coupled in parallel with the circuit interrupter to limit the level of fault current through the interrupter, and thus, through the power system. For an ac power system, two commutating circuits are connectable in parallel with the circuit interrupter, the commutating circuits having equal commutating capacitances, but opposite polarity. Active interrupting of fault current in accordance with the present invention applies to an ac power system of any voltage and frequency. Further, the circuit interrupter can comprise any circuit breaker which has the capability of interrupting high frequency currents, however, a vacuum interrupter is preferred.

The current limiting device and method presented can be applied to new electrical installations or to upgrading of existing circuit interrupting equipment. Additionally, the invention applies to both single-phase systems, as well as to three-phase systems. In all embodiments, a fast acting mechanism is employed to initiate opening of the circuit interrupter contacts in a sufficiently short amount of time to establish a physical gap between the contacts of the interrupter and draw an arc within the interrupter. Commutation of current through the interrupter then occurs before the fault current has an opportunity to reach peak value. Ideally, the circuit interrupter and fast acting mechanism are designed to respond to maintain the fault current at less than one-half its normal peak value.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

We claim:

1. A device for controlling fault current in an ac power system, said device comprising:

a circuit interrupter comprising a pair of separable contacts for connection in series with said ac power system, said circuit interrupter being operable to open circuit said ac power system at zero current therethrough to thereby control the fault current;

a first commutation circuit and a second commutation circuit connectable in parallel with said circuit interrupter, said first commutation circuit having a first commutating capacitance with a positive polarity when charged and said second commutation circuit having a second commutating capacitance with a negative polarity when charged;

a control circuit for opening said circuit interrupter upon detection of fault current and for selecting and connecting either said first commutation circuit or said second commutation circuit in parallel with said circuit interrupter to thereby discharge into said circuit interrupter said first commutating capacitance or said second commutating capacitance, respectively, wherein said control circuit selects between said first commutation circuit and said second commutation circuit to apply across the circuit interrupter commutating capacitance of opposite polarity to a polarity of the fault current detected such that fault current in the circuit interrupter is actively driven to zero before a peak magnitude of said fault current can be reached; and further comprising a fast acting mechanism coupled between said circuit interrupter and said control circuit, said fast acting mechanism being employed by said control circuit to open said pair of separable contacts upon detection of fault current, wherein said fast acting mechanism operates to open said pair of separable contacts within a quarter of a 60 Hertz cycle.

2. The device of claim 1, wherein said device actively drives fault current in the circuit interrupter to zero such that the fault current remains less than one-half its potential peak magnitude.

3. The device of claim 1, wherein said circuit interrupter comprises a vacuum interrupter, a silicon-controlled rectifier, an air blast breaker, a $SF_6$ breaker, a conventional oil breaker, or a thyristor.

4. The device of claim 1, wherein said first commutating capacitance of said first commutation circuit has a magnitude equal to a magnitude of said second commutating capacitance of said second commutation circuit.

5. The device of claim 4, wherein said first commutating capacitance comprises a first commutating capacitor, and said second commutating capacitance comprises a second commutating capacitor.

6. The device of claim 1, wherein said control circuit for connecting either said first commutation circuit or said second commutation circuit in series with said power system comprises either a triggered vacuum gap or a silicon-controlled rectifier.

7. The device of claim 1, wherein said control circuit further comprises means for automatically closing the pair of separable contacts of said circuit interrupter after extinguishing of said fault current by said device.

8. The device of claim 1, wherein said ac power system comprises a 60 Hertz ac power distribution system with a normal operating voltage in a range of 2 kv to 25 kV.

9. The device of claim 1, wherein said control circuit comprises means for opening said circuit interrupter to draw an arc inside said circuit interrupter and then for connecting either said first commutation circuit or said second commutation circuit in parallel with said circuit interrupter to thereby extinguish said arc.

10. A device for controlling fault current in an ac power system, said device comprising:

a circuit interrupter comprising a pair of separable contacts for connection in series with said ac power system, said circuit interrupter being operable to open circuit said ac power system at zero current therethrough to thereby control the fault current;

a first commutation circuit and a second commutation circuit connectable in parallel with said circuit interrupter, said first commutation circuit having a first commutating capacitance with a positive polarity when charged and said second commutation circuit having a second commutating capacitance with a negative polarity when charged;

a control circuit for opening said circuit interrupter upon detection of fault current and for selecting and connecting either said first commutation circuit or said second commutation circuit in parallel with said circuit interrupter to thereby discharge into said circuit interrupter said first commutating capacitance or said second commutating capacitance, respectively, wherein said control circuit selects between said first commutation circuit and said second commutation circuit to apply across the circuit interrupter commutating capacitance of opposite polarity to a polarity of the fault current detected such that fault current in the circuit interrupter is actively driven to zero before a peak magnitude of said fault current can be reached; and wherein said first commutating capacitance and said second commutating capacitance comprise a single capacitor, said single capacitor being shared between said first commutation circuit and said second commutation circuit, said first commutation circuit and said second commutation circuit each comprising two switches, each switch of said two switches being disposed on a different side of said single capacitor for connecting said single capacitor across said circuit interrupter with either said positive polarity or said negative polarity.

11. The device of claim 10, wherein said switches each comprise a triggered vacuum gap or a silicon-controlled rectifier.

12. A device for controlling fault current in an ac power system, said device comprising:

a circuit interrupter comprising a pair of separable contacts for connection in series with said ac power system, said circuit interrupter being operable to open circuit said ac power system at zero current therethrough to thereby control the fault current;

a first commutation circuit and a second commutation circuit connectable in parallel with said circuit interrupter, said first commutation circuit having a first commutating capacitance with a positive polarity when charged and said second commutation circuit having a second commutating capacitance with a negative polarity when charged;

a control circuit for opening said circuit interrupter upon detection of fault current and for selecting and connecting either said first commutation circuit or said second commutation circuit in parallel with said circuit interrupter to thereby discharge into said circuit interrupter said first commutating capacitance or said second commutating capacitance, respectively, wherein said control circuit selects between said first commutation circuit and said second commutation circuit to apply across the circuit interrupter commutating capacitance of opposite polarity to a polarity of the fault current detected such that fault current in the circuit interrupter is actively driven to zero before a peak magnitude of said fault current can be reached; and wherein said ac power system comprises a three phase ac power system, and wherein said circuit interrupter comprises a three phase circuit interrupter and said first commutation circuit and said second commutation circuit each comprise a three phase commutation circuit.

13. The device of claim 12, wherein each three phase commutation circuit comprises three commutating circuits, each commutating circuit being connectable to a different phase of said three phase ac circuit interrupter.

14. A device for controlling fault current in a dc power system, said device comprising:

a circuit interrupter comprising a pair of separable contacts for connection in series with the dc power system, said circuit interrupter being operable to open circuit said dc power system at zero current therethrough to thereby control the fault current;

a commutation circuit connectable in parallel with the circuit interrupter, said commutation circuit having a commutating capacitance; and a control circuit for opening said circuit interrupter upon detection of a transient fault current in the circuit interrupter and for coupling said commutation circuit across said circuit interrupter for commutation of said transient fault current within the circuit interrupter by driving current within the circuit interrupter to zero thereby allowing said circuit interrupter to open circuit said dc power system, said control circuit comprising means for commutating the fault current within the circuit interrupter within a time interval less than approximately one-half a natural time constant of the dc power system, wherein said transient fault current is interrupted before reaching steady state magnitude.

15. The device of claim 14, wherein said circuit interrupter, commutation circuit and control circuit comprise automatic means for interrupting the transient fault current, and wherein said control circuit includes means for automatically resetting said circuit interrupter and said commutation circuit upon dissipation of said fault current.

16. A fast acting mechanism for mechanically opening a circuit interrupter having a pair of separable contacts connectable in series with a power system, said pair of separable contacts including a stationary contact and a moveable contact, said fast acting mechanism comprising:

a housing having an inner chamber;

a piston sized to reciprocate within said inner chamber of said housing, said piston having an annular groove in an outer circumference thereof;

a split ring sized to reside within said annular groove, said split ring having a split therein;

a key having a first end sized to reside within the split in said split ring and a second end sized to reside within an opening in said housing, said key being reciprocal transverse to a reciprocable direction of said piston;

means for coupling said piston to said movable contact of said circuit interrupter; and means for biasing said piston to move said movable contact of said circuit interrupter to an open position, whereby when said key is moved out from engagement with said split ring, said means for biasing said piston moves said piston within said inner chamber of said housing and pulls said moveable contact from said stationary contact, thereby opening said circuit interrupter.

17. The fast acting mechanism of claim 16, wherein when collapsed said split ring resides entirely within said annular groove in said piston, said key maintaining said split ring in an expanded position when residing within the split in the split ring, whereby withdrawal of the key from the split of the split ring causes the split ring to automatically collapse within the annular groove of the piston, said split ring residing partially outside said annular groove in said piston when in said expanded position.

18. The fast acting mechanism of claim 17, wherein said housing further comprises an inner wall defining said inner chamber, said inner wall having a conical wall portion adjacent to said piston when said piston is in retracted position, said split ring residing against said conical wall portion when said split ring is in expanded position.

19. The fast acting mechanism of claim 16, wherein said means for biasing comprises at least one torsional spring for biasing said piston in an extended position with said moveable contact coupled thereto disposed away from said stationary contact of said circuit interrupter.

20. A device for controlling fault current in a power system, said device comprising:

multiple circuit interrupters coupled in parallel to form an interruption circuit, each circuit interrupter comprising a pair of separable contacts, said interruption circuit being connected in series with said power system, wherein each circuit interrupter of said multiple circuit interrupters coupled in parallel conducts load current from said power system during normal operation;

at least one circuit interrupter of said interruption circuit having a first current rating, and at least one circuit interrupter of said interruption circuit having a second current rating, said second current rating being less than said first current rating; and a control circuit for opening upon detection of fault current in the power system said at least one circuit interrupter of said second current rating prior to opening of said at least one circuit interrupter of said first current rating so that said fault current passes entirely through said at least one current interrupter of said first current rating.

21. The device of claim 20, wherein said multiple circuit interrupters coupled in parallel each share an equal amount of load current from said power system under normal operation.

22. The device of claim 20, wherein said power system comprises in ac power system, and wherein said control circuit functions to open said at least one circuit interrupter of said second current rating within a fraction of a half cycle of said fault current.

23. A device for controlling fault current in a power system, said device comprising:

multiple circuit interrupters coupled in parallel to form an interruption circuit, each circuit interrupter comprising a pair of separable contacts, said interruption circuit being connected in series with said power system;

at least one circuit interrupter of said interruption circuit having a first current rating, and at least one circuit interrupter of said interruption circuit having a second current rating, said second current rating being less than said first current rating;

a control circuit for opening upon detection of fault current in the power system said at least one circuit interrupter of said second current rating prior to opening of said at least one circuit interrupter of said first current rating so that said fault current passes entirely through said at least one current interrupter of said first current rating; and further comprising means for actively driving current in said at least one circuit interrupter of said first current rating to zero upon opening of said at least one circuit interrupter of said second current rating, said means for actively driving current comprising means for actively driving fault current in the at least one circuit interrupter of said first current rating to zero before the fault current can reach a peak magnitude.

24. The device of claim 23, wherein said means for actively driving current comprises a first commutation circuit and a second commutation circuit connectable in parallel with said at least one circuit interrupter of said first current rating, said first commutation circuit having a first commutating capacitance with a positive polarity when charged and said second commutation circuit having a second commutating capacitance with a negative polarity when charged, and wherein said control circuit further comprises means for selecting and connecting either said first commutation circuit or said second commutation circuit in parallel with said at least one circuit interrupter of said first current rating to thereby discharge into said circuit interrupter said first commutating capacitance or said second commutating capacitance, respectively, wherein said control circuit selects between said first commutation circuit and said second commutation circuit to apply across the at least one circuit interrupter of said first current rating a commutating capacitance of opposite polarity to a polarity of the fault current passing through said interruption circuit.

* * * * *